United States Patent
Buglione et al.

(10) Patent No.: US 6,817,329 B2
(45) Date of Patent: Nov. 16, 2004

(54) IDLE STOP-START CONTROL METHOD

(75) Inventors: Arthur J Buglione, Troy, MI (US); Edmund Tworkowski, Rochester Hills, MI (US); Jeffrey P Cherry, Livonia, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 105 days.

(21) Appl. No.: 10/292,050

(22) Filed: Nov. 12, 2002

(65) Prior Publication Data

US 2004/0089258 A1 May 13, 2004

(51) Int. Cl.$^7$ .............................................. F02N 17/00
(52) U.S. Cl. .................................. 123/179.4; 123/179.3
(58) Field of Search ........................... 123/179.3, 179.4; 73/118.1; 307/10.6

(56) References Cited

U.S. PATENT DOCUMENTS

| | | | |
|---|---|---|---|
| 6,371,877 B1 | | 4/2002 | Schroeder et al. |
| 6,371,889 B1 | * | 4/2002 | Kuroda et al. ............... 477/181 |
| 6,418,899 B1 | | 7/2002 | Bluemel et al. |
| 6,504,259 B1 | * | 1/2003 | Kuroda et al. ............ 290/40 C |
| 6,532,926 B1 | * | 3/2003 | Kuroda et al. ............ 123/179.4 |
| 6,634,332 B2 | * | 10/2003 | Saito et al. ............... 123/179.3 |

* cited by examiner

*Primary Examiner*—Mahmoud Gimie
(74) *Attorney, Agent, or Firm*—Ralph E. Smith

(57) ABSTRACT

An idle stop-start control method includes initiating a monitoring system, determining if the engine is running, and monitoring the engine to detect a shut-down condition or a sustain condition. The method includes initiating the restarting of an engine based on the condition of input parameters.

19 Claims, 3 Drawing Sheets

IDLE STOP-START CONTROL METHOD

FIELD OF THE INVENTION

The present invention relates to a control method and more particularly to an idle stop-start control method for an internal combustion engine.

BACKGROUND OF THE INVENTION

Control methods are used in various applications to analyze data and perform actions; as such, control methods have vast applicability in the automotive arts. To that end, many controls within the engine and transmission utilize methods which are either user implemented or automatic.

SUMMARY OF THE INVENTION

The present invention is directed to a method for providing idle start-stop control for an internal combustion engine. The invention allows for appropriate engine shut down only when there is insufficient demand for the benefits obtained from a running engine.

In one aspect of the invention, a method of starting and shutting down an engine of a vehicle during use thereof to conserve energy includes the following steps. A plurality of vehicle operating conditions are monitored and an engine shut-down indicator is set whenever each of the plurality of vehicle operating conditions are acceptable. An engine sustain indicator is set whenever any one of the plurality of vehicle operating conditions is unacceptable. The engine is shut down whenever the engine is running and the shut-down indicator is set. The engine is started whenever the engine is not running and the engine sustain indicator is set.

In another aspect of the invention, a system for starting and shutting down an engine of a vehicle during use thereof to conserve energy includes a vehicle engine controller and a plurality of sensors for monitoring a plurality of vehicle operating conditions, the sensors being coupled to the vehicle engine controller. The engine controller is operative to shut down the engine whenever the engine is running and each of the plurality of sensors indicates an acceptable operating condition. The engine controller is further operative to start the engine whenever the engine is not running and any one of the plurality of sensors indicates an unacceptable condition.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawing, wherein.

DETAILED DESCRIPTION

Figure 1A:
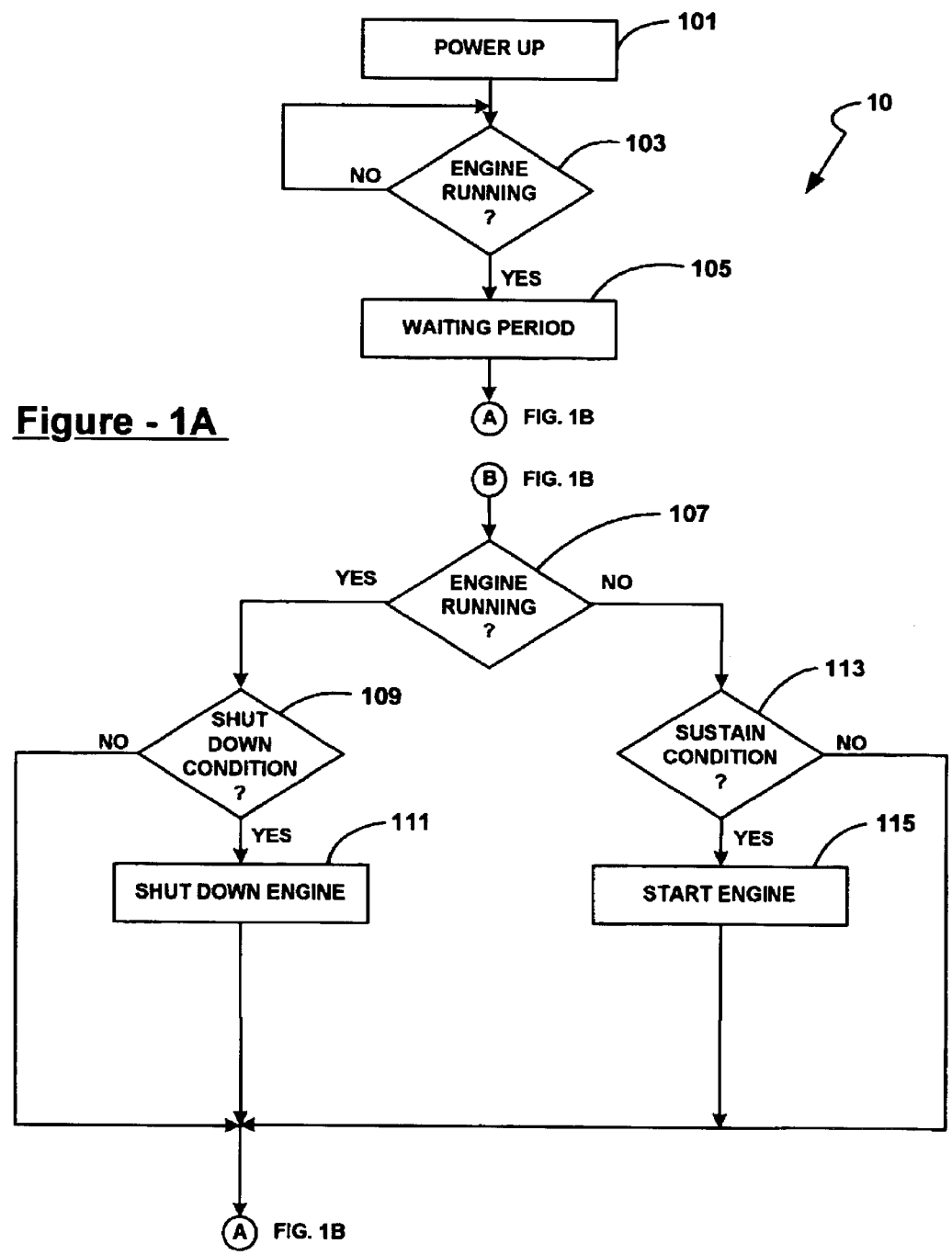
FIGS. 1A and 1B present a flow chart showing a general logical progression of the idle stop-start control method in accordance with the teachings of the present invention.
Figure 1B:
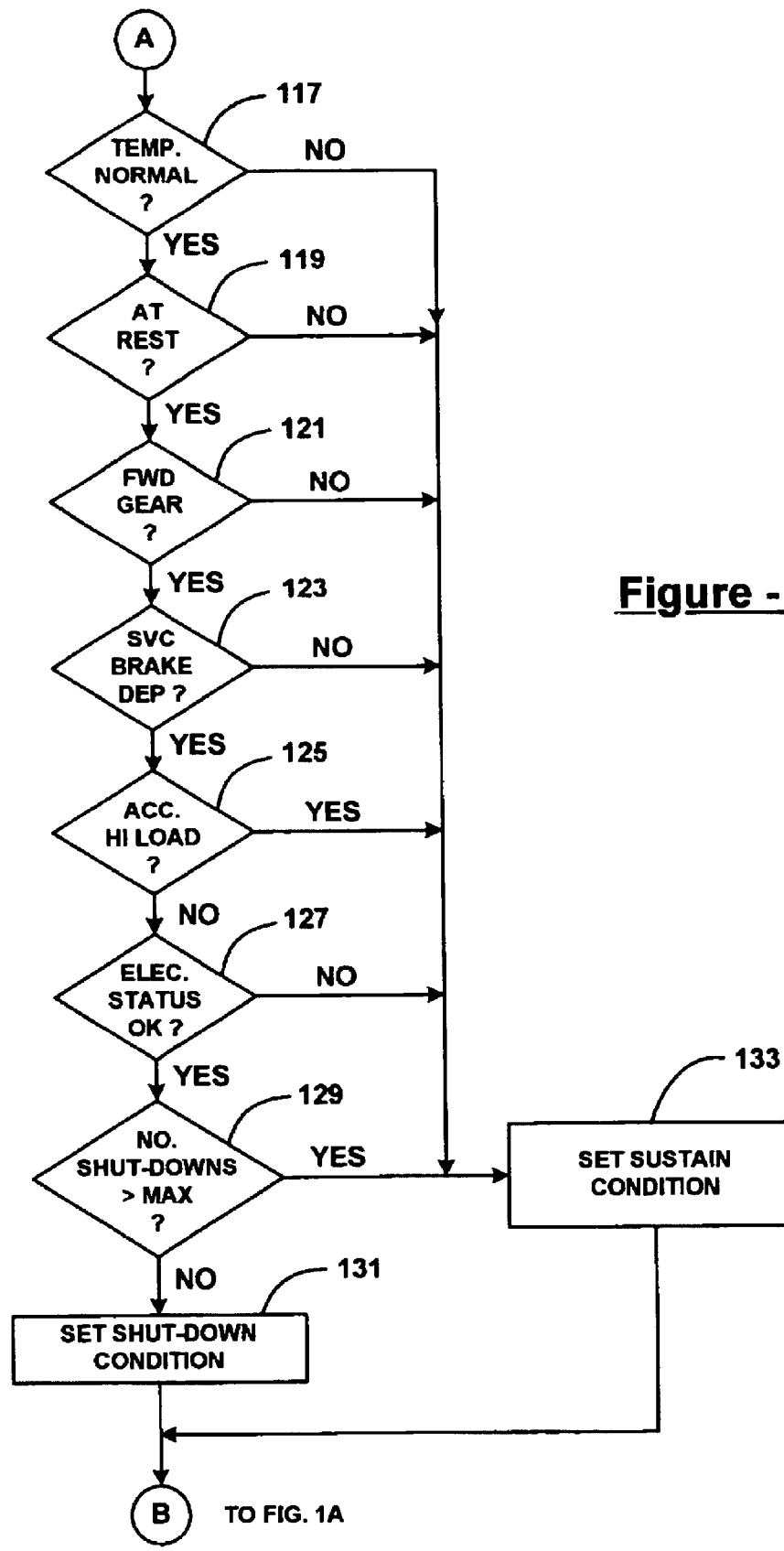

With reference to FIGS. 1A and 1B, idle stop-start control method 10 begins at power-up step 101. At step 103, the control method will not activate until the vehicle's engine is determined to be running. When the engine is deemed running, the method then proceeds to the wait period step 105 to allow for an engine warm-up interval.

After the warm-up period, the method proceeds to step 117 of FIG. 1B to begin a series of tests to determine whether an engine sustain or an engine shut-down condition state should be set.

The series of decision steps in FIG. 1B comprises multiple determinations of various engine and vehicle conditions. While the preferred embodiment requires that all of the conditions tested in steps 117–129 be satisfied to trigger a change in engine status, differing vehicle configurations may demand that certain conditions be relaxed or even eliminated to ensure compatibility across many vehicle configurations. Hence, the requirement that all conditions be satisfied for a status change serves as an example but does not serve to limit the invention as disclosed.

With further reference to the flow chart of FIG. 1B, step 117 determines if the engine is at a normal running temperature, for example, a range of 170° F. ($\approx$76° C.) to 240° F. ($\approx$116° C.). If the temperature is deemed abnormal, the method proceeds to step 133 to set a sustain condition flag. The method then returns to point B of FIG. 1A.

If the temperature is deemed normal, the method proceeds to decision block 119 where it is determined whether or not the vehicle is at rest. If the vehicle is not at rest, the method proceeds to step 133 and the sustain condition flag is set.

If the vehicle is determined to be at rest, then the method proceeds to decision block 121 where the state of the transmission is tested to determine whether the vehicle is in forward gear. If not in a forward gear, then step 133 is entered where the sustain condition flag is set. If the vehicle is in forward gear, the method proceeds to decision block 123 which determines whether the service brake is depressed. If the brake is not depressed, the method proceeds to step 133 to set the sustain condition flag. If the service brake is depressed, the method proceeds to decision block 125 where it is determined whether or not the vehicle accessories, such as the air conditioning units, are under a high load condition.

If the accessories are in a high load condition then the method proceeds to step 133 where the sustain condition flag is set. If not under high load at the accessories, the method proceeds to decision block 127 where the status of the electrical system of the vehicle is checked. If the electrical system is found to be in an abnormal operational state, the method proceeds to block 133 to set the sustain condition flag. If the status of the electrical system of the vehicle is normal, then the method proceeds to decision block 129.

Decision block 129 examines the number of engine shut downs over a predetermined past time interval. If the number of shut downs of the engine exceeds a predetermined maximum value, then block 133 sets the sustain condition flag. If the number of shut downs is less than or equal to the predetermined maximum, then the routine proceeds to block 131 where a shut-down condition flag is set. The method then returns to step B of FIG. 1A.

Returning now to point B of FIG. 1A, at decision block 107, the method determines whether the vehicle's engine is currently running. If the engine is running, the method proceeds to decision block 109 which monitors the condition of the shut down flag. If the shut-down condition has been set (as in FIG. 1B), the engine is shut down at step 111 and the routine returns to point A of FIG. 1B. If at step 109 the shut-down condition has not been set, then no action is taken, and the routine returns to point A of FIG. 1B.

If at step 107 the engine is determined not to be running, then the method proceeds to decision 113 to examine the state of the sustain condition flag. If the sustain condition has been set, then the engine is started at step 115 and the routine returns to point A of FIG. 1B. If the sustain condition flag is not set at step 113, then no action is taken with regard to changing the engine status and the routine proceeds to point A of FIG. 1B.

With further reference to decision step 119 of FIG. 1B, it may be appropriate in a hybrid vehicle utilizing both electric and internal combustion engines to also include a coast condition to indicate that engine status change may be required. In the hybrid vehicle situation, to satisfy the condition of being completely at rest, such a vehicle may come to a complete stop or be in a coast condition. The coast condition would generally be defined as a condition wherein the driver has depressed the service brake or has not pressed any pedal but the vehicle is still in motion. If a hybrid vehicle has not come to a complete stop or is not in a coast condition at step 119, the method would proceed to step 133 for setting a sustain condition flag. If, on the other hand, the vehicle has come to a complete stop or is in a coast condition, the routine will then proceed to the next test at decision block 121.

Figure 2:
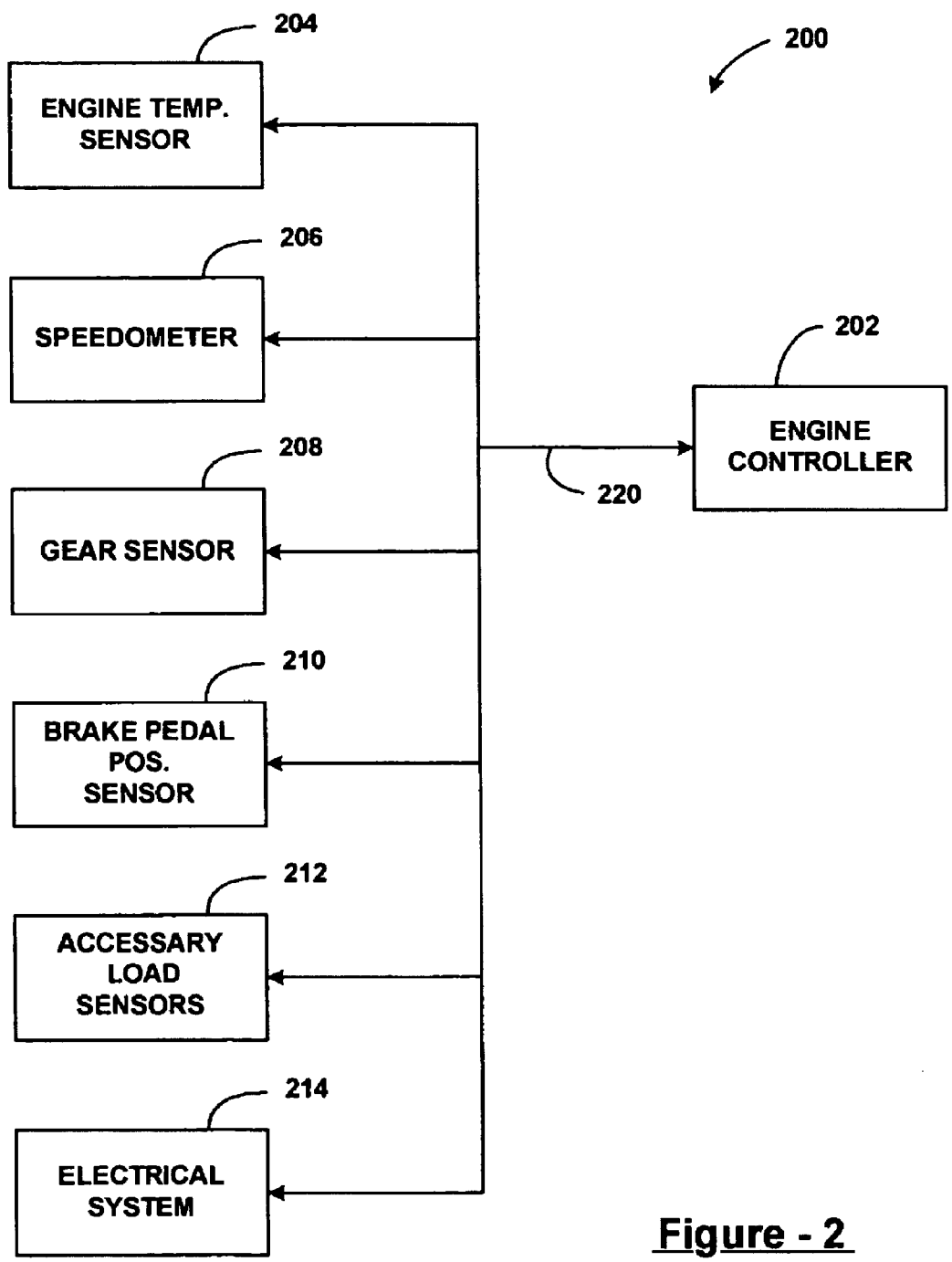
FIG. 2 sets forth a functional block diagram of a system arranged in accordance with the principles of the invention.

With reference to FIG. 2, a block diagram of a system arranged for implementing the method of FIGS. 1A and 1B is set forth. A software program for conducting the steps set forth above in conjunction with FIGS. 1A and 1B could, for example, reside in a microprocessor-based engine controller 202 of the vehicle. Controller 202 would, via a bidirectional data bus 220 be coupled for receipt of sensor signals from a variety of sources.

Such sensors would include engine temperature sensor 204, speed sensor or speedometer 206, gear state sensor 208, brake pedal position sensor 210, accessory load sensors 212 and electrical system scan points 214.

In the particular embodiment, the idle stop-start control method 10 is integral to a vehicle with automatic transmission and an internal combustion engine. Those skilled in the art, however, will readily appreciate that the method 10 can be used in multiple types of vehicles and with many different types of power plants. Further, automatic transmissions may take the form of various automatically controlled transmissions, clutchless manual transmissions, or automatically-controlled manual transmissions. As such, use in a vehicle with an automatic transmission and with an internal combustion engine is intended only as an example and otherwise does not serve to limit the disclosed invention.

One skilled in the art will readily appreciate that varying maximum and minimum temperatures can accommodate other engine and vehicle-wide demands. For example, physical limitations of the engine design may warrant restricting the upper limit of the engine temperature to avoid damage to engine components. In another example, environmental concerns may change the lower limit of engine temperatures to avoid running the engine too cold and possibly increasing environmental pollutants. As such, normal engine temperatures, and the permissible deviations from the normal engine temperatures, are examples and do not serve to limit the invention as disclosed.

As described earlier, temperatures outside the aforementioned normal ranges will cause the method 10 to proceed to step 133 without shutting down the engine. For example a hot engine (where engine coolant temperature is higher than normal; such as congested traffic in the middle of summer), will generally always indicate that conditions are not set for engine shut down.

An example of an accessory high-load condition at step 125 of FIG. 1B, is where the air conditioning of the vehicle is on, requiring the air conditioning compressor to be running. Demand for air conditioning in the vehicle could cause the idle stop-start method 10 to enter a sustain condition at step 133. Other load conditions could also produce the same result; for example, in a scenario where defogging performance is required from the heating, ventilation and air conditioning (HVAC) system in tandem with an electric heating element, the load on the HVAC system and other accessories would also cause the idle stop-start method 10 proceed to step 133.

Vehicle electrical status is normal at step 127 of FIG. 1B when the common electrical systems monitored in a vehicle are normal. For example, it is common to monitor system voltage and faults from the engine controller 202 (FIG. 2). As such, abnormal readings from the common engine monitoring sensors or fault warnings produced by the engine controller will cause the method 10 to enter a sustain condition at step 133.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of starting and shutting down an engine of a vehicle during use thereof to conserve energy, the method comprising the steps of:

monitoring a plurality of vehicle operating conditions, including a number of times within a preselected time interval that the engine has been shut down;

setting an engine shut-down indicator whenever each of the plurality of vehicle operating conditions is acceptable;

setting an engine sustain indicator whenever any one of the plurality of vehicle operating conditions is unacceptable;

determining whether or not the engine is running;

shutting down the engine whenever the engine is running and the shut-down indicator is set; and starting the engine whenever the engine is not running and the engine sustain indicator is set.

2. The method of claim 1 wherein the plurality of vehicle operating conditions includes engine running temperature.

3. The method of claim 2 wherein the engine running temperature is acceptable when greater than about 170° F. and less than about 240° F.

4. The method of claim 1 wherein the plurality of vehicle operating conditions includes vehicle velocity.

5. The method of claim 4 wherein a velocity of zero is acceptable.

6. The method of claim 1 wherein the plurality of vehicle operating conditions includes a coasting condition.

7. The method of claim 1 wherein the plurality of vehicle operating conditions includes a current transmission gear.

8. The method of claim 7 wherein current transmission gear is acceptable whenever vehicle transmission is in a forward gear.

9. The method of claim 1 wherein the plurality of vehicle operating conditions includes service brake status.

10. The method of claim 9 wherein service brake depression is acceptable.

11. The method of claim 1 wherein the plurality of vehicle operating conditions includes load conditions of engine accessories.

12. The method of claim 11 wherein any accessory high load condition is unacceptable.

13. The method of claim 1 wherein the plurality of vehicle operating conditions includes vehicle electrical system status.

14. The method of claim 13 wherein a normal vehicle electrical system status is acceptable.

15. The method of claim 1 wherein the engine comprises an internal combustion engine.

16. The method of claim 1 wherein the engine comprises a hybrid combination of electrical and internal combustion energy sources.

17. The method of claim 1 further comprising initiating power-up of the vehicle and waiting for a predetermined period of time prior to the step of monitoring.

18. A system for starting and shutting down an engine of a vehicle during use thereof to conserve energy, the system comprising:

a vehicle engine controller; and a plurality of sensors for monitoring a plurality of vehicle operating conditions, including a number of times within a reselected time interval that the engine has been shut down, the sensors coupled to the vehicle engine controller;

the engine continuer operative to shut down the engine whenever the engine is running and each of the plurality of sensors indicates an acceptable operating condition, and the engine controller operative to start the engine whenever the engine is not running and any one of the plurality of sensors indicates an unacceptable operating condition.

19. The system of claim 18 wherein the plurality of sensors includes at least one of the following:

an engine temperature sensor;

a speedometer;

a gear sensor;

a brake pedal position sensor;

an accessory load sensor; and an electrical system sensor.

* * * * *